(12) United States Patent
White et al.

(10) Patent No.: US 9,177,500 B2
(45) Date of Patent: Nov. 3, 2015

(54) DISPLAY WITH SECURE DECRYPTION OF IMAGE SIGNALS

(75) Inventors: Christopher J. White, Avon, NY (US); Ronald S. Cok, Rochester, NY (US); John W. Hamer, Rochester, NY (US)

(73) Assignee: Global OLED Technology LLC, Herndon, VA (US)

( * ) Notice: Subject to any disclaimer, the term of this patent is extended or adjusted under 35 U.S.C. 154(b) by 580 days.

(21) Appl. No.: 13/017,514

(22) Filed: Jan. 31, 2011

(65) Prior Publication Data
US 2012/0195426 A1 Aug. 2, 2012

(51) Int. Cl.
*H04N 7/167* (2011.01)
*G06F 11/30* (2006.01)
*G06F 12/14* (2006.01)
(Continued)

(52) U.S. Cl.
CPC .............. *G09G 3/2092* (2013.01); *G06F 21/84* (2013.01); *G06F 21/87* (2013.01); *G09G 3/2085* (2013.01); *G09G 3/2088* (2013.01); *H01L 27/3255* (2013.01); *G09G 3/2096* (2013.01); *G09G 2300/0408* (2013.01); *G09G 2300/0426* (2013.01); *G09G 2300/0439* (2013.01); *G09G 2320/106* (2013.01); *G09G 2352/00* (2013.01); *G09G 2370/16* (2013.01); *H01L 27/3244* (2013.01)

(58) Field of Classification Search
CPC ............ H01L 27/3255; H01L 27/3244; H01L 27/1214; H01L 27/3262; H01L 2924/13069; G09G 3/2088; G09G 3/2085; G09G 3/2092; G09G 3/2096; G09G 2300/0408; G09G 2300/0426; G09G 2300/0439; G09G 2320/106; G09G 2352/00; G09G 2370/16; G06F 21/86; G06F 21/87; G06F 21/84

USPC ............ 345/206; 380/200–242; 313/498–512
See application file for complete search history.

(56) References Cited

U.S. PATENT DOCUMENTS

| 4,769,292 A | 9/1988 | Tang et al. |
| 5,061,569 A | 10/1991 | VanSlyke et al. |

(Continued)

FOREIGN PATENT DOCUMENTS

| EP | 1887489 A2 | 2/2008 |
| WO | WO2007/051498 | 5/2007 |
| WO | WO 2010/019185 A1 | 2/2010 |

OTHER PUBLICATIONS

Automated Production Equipment (A.P.E.), "Reworking Plastic Parts", ape.com/content/view/21/53/ article, 2009.

(Continued)

*Primary Examiner* — Jeffrey D Popham
*Assistant Examiner* — Forrest Carey
(74) *Attorney, Agent, or Firm* — Global OLED Technology LLC

(57) ABSTRACT

A display securely decrypts an encrypted image signal. Pixels are disposed between the display substrate and cover in a display area, and provide light to a user in response to a drive signal. Control chiplets disposed between the display substrate and cover in the display area are each connected to one or more of the plurality of pixels. Each receives a respective control signal and produce respective drive signal(s) for the connected pixel(s). A decryption chiplet is disposed between the display substrate and cover. It includes means for receiving the encrypted image signal and a decryptor for decrypting the encrypted image signal to produce a respective control signal for each of the control chiplets.

11 Claims, 11 Drawing Sheets

(51) Int. Cl.
*G09G 3/20* (2006.01)
*G06F 21/87* (2013.01)
*H01L 27/32* (2006.01)
*G06F 21/84* (2013.01)

(56) References Cited

U.S. PATENT DOCUMENTS

| | | | |
|---|---|---|---|
| 5,724,426 | A | 3/1998 | Rosenow et al. ............... 380/25 |
| 6,064,739 | A | 5/2000 | Davis |
| 6,081,784 | A | 6/2000 | Tsutsui |
| 6,442,448 | B1 | 8/2002 | Finley et al. |
| 6,879,098 | B2 | 4/2005 | Buchwalter et al. |
| 6,911,675 | B2 | 6/2005 | Kato |
| 7,206,940 | B2 | 4/2007 | Evans et al. |
| 7,557,367 | B2 | 7/2009 | Rogers et al. |
| 7,562,379 | B2 | 7/2009 | Hardacker et al. |
| 7,622,367 | B1 | 11/2009 | Nuzzo et al. |
| 8,497,821 | B2 | 7/2013 | Cok |
| 2002/0163911 | A1 | 11/2002 | Wee et al. ..................... 370/389 |
| 2004/0133794 | A1 | 7/2004 | Kocher et al. |
| 2004/0141613 | A1 | 7/2004 | Hayashi .......................... 380/28 |
| 2005/0114691 | A1* | 5/2005 | Gilg ............................. 713/200 |
| 2005/0136990 | A1 | 6/2005 | Hardacker et al. |
| 2005/0201726 | A1 | 9/2005 | Malcolm et al. |
| 2006/0055864 | A1 | 3/2006 | Matsumura et al. |
| 2006/0158737 | A1 | 7/2006 | Hu et al. |
| 2007/0013538 | A1* | 1/2007 | Dalzell ......................... 340/652 |
| 2007/0032089 | A1 | 2/2007 | Nuzzo et al. |
| 2007/0057263 | A1 | 3/2007 | Kahen |
| 2008/0148063 | A1* | 6/2008 | Hanko et al. .................. 713/189 |
| 2008/0308797 | A1* | 12/2008 | Akimoto et al. ................ 257/43 |
| 2009/0060197 | A1* | 3/2009 | Taylor et al. .................. 380/277 |
| 2009/0199960 | A1 | 8/2009 | Nuzzo et al. |
| 2010/0039030 | A1 | 2/2010 | Winters et al. |
| 2010/0123268 | A1 | 5/2010 | Menard |
| 2010/0253677 | A1* | 10/2010 | Kroll et al. .................... 345/419 |
| 2011/0291084 | A1* | 12/2011 | Burroughes et al. ............ 257/40 |
| 2013/0234115 | A1* | 9/2013 | Song et al. ..................... 257/40 |

OTHER PUBLICATIONS

Digital Content Protection, LLC., "High-bandwidth digital content protection system", Revision 1.4, Jul. 8, 2009, Copyright 1999-2009 by Intel Corporation, www.digital-cp.com.

Mills, "Intel: Leaked HDCP copy protection code is legit", Sep. 16, 2010, http://news.cnet.com/8301-27080_3-20016756-245.html.

Chen, "FCOB Reliability Evaluation Simulating . . .", IEEE Transactions on Components, Packaging, and Manufacturing Technology, Part C, vol. 19, No. 4, pp. 270-276, Oct. 1996.

Bartholomew, "An Engineer's Handbook of Encapsulation and Underfill Technology", Electrochemical Publications Ltd., Copyright 1999.

* cited by examiner

DISPLAY WITH SECURE DECRYPTION OF IMAGE SIGNALS

CROSS REFERENCE TO RELATED APPLICATIONS

Reference is made to commonly-assigned U.S. Ser. No. 12/191,478, filed Aug. 14, 2008, entitled "OLED device with embedded chip driving" by Winters et al., published as U.S. 2010/0039030 on Feb. 18, 2010 and now U.S. Pat. No. 7,999,454, and to commonly-assigned, co-filed U.S. Ser. No. 13/017,438, entitled "Display with secure decompression of image signals" by White et al. and since published as U.S. 2012/0194564, the disclosures of both of which are incorporated by reference herein.

FIELD OF THE INVENTION

The present invention relates to flat-panel displays, particularly solid-state electroluminescent (EL) flat-panel displays such as organic light-emitting diode (OLED) displays, and more particularly to such devices having secure decryption functions.

BACKGROUND OF THE INVENTION

Content to be shown on a display is often provided in encrypted form to reduce the risk of piracy (unauthorized duplication). For example, the High-bandwidth Digital Content Protection System (HDCP) is a commonly-used standard for encrypting video data by exclusive-ORing (XORing) the data with a pseudo-random bit stream (PRBS)—see Digital Content Protection, LLC, *High-bandwidth digital content protection system*, Revision 1.4, Jul. 8, 2009. Although HDCP protects data in transit between devices (e.g., between a DVD player and a TV using HDMI, the High-Definition Multimedia Interface), at some point within a display the data must be decrypted and fed to the pixels. Attackers (e.g., pirates) who can gain access to the data after the point of decryption can make a full pirate copy. Moreover, the master key for HDCP has recently been publically disclosed, so HDCP-encrypted content can now be freely decrypted by an attacker—see Mills, Elinor, "Intel: Leaked HDCP copy protection code is legit." Sep. 16, 2010.

Flat-panel displays are commonly employed to display content transported in encrypted form. Liquid-crystal displays (LCD), plasma displays (PDP) and electroluminescent (EL) displays are examples of flat-panel displays. EL displays can be made from various emitter technologies, including coatable-inorganic light-emitting diode, quantum-dot, and organic light-emitting diode (OLED). EL emitters use current passing through thin films of EL material to produce light. EL displays employ both active-matrix and passive-matrix control schemes and can employ a plurality of pixels. Each pixel can include an EL emitter; drive transistors for driving current through the EL emitter are also provided on the display. The pixels are typically arranged in two-dimensional arrays with a row and a column address for each pixel, and having a data value associated with the pixel. Pixels can be of different colors, such as red, green, blue and white.

Initially, display systems used separate decryption ICs located off the display substrate. However, the outputs of the decryption ICs on such systems can readily be probed to pirate the content.

FIG. 9 shows a more recent method of protection against piracy employed in a conventional EL display. Display substrate 400 supports EL emitter 50 under cover 408. Cover 408 can be glass, metal foil or other materials known in the art. Seal 409 is used to prevent moisture from entering sealed area 16, the space between the substrate and the cover, as EL emitter 50 is damaged by moisture. Seal 409 can include an adhesive and desiccant as known in the art. Sealed area 16 includes display area 15, in which all of the EL emitters 50 are located. EL emitter 50 receives current through metal layer 403 from driver IC 420 via solder ball 421, or a wire bond (not shown) in pad-up configurations as known in the art. Driver IC 420 can be a chip-on-glass (CoG), flip-chip or BGA (Ball Grid Array) package, or a CSP (chip-scale package). Driver IC 420 is outside of the display area 15, and outside of sealed area 16. Glob-top 422, which can be an epoxy or other molding compound, covers driver IC 420 to make it difficult to remove driver IC 420 from display substrate 400. Driver IC 420 receives encrypted data and provides decrypted data to EL emitter 50. Glob-top 422 can be extended over metal layer 403 up to seal 409 to provide additional security. U.S. Patent Application Publication No. 2006/0158737 by Hu et al., paragraph 44, is an example of a related scheme. U.S. Pat. No. 6,442,448 by Finley et al., cols. 18-19, has further discussion of using epoxy to protect security-sensitive components. U.S. Patent Application Publication No. 2005/0201726 by Malcolm et al., paragraphs 54 and 81, also describes alternative ways of protecting transmissions of data inside a device.

However, glob-top is frequently used in the electronics industry for non-security applications, e.g., environmental resistance, and so rework tools have been developed which are capable of removing epoxy with minimal damage to the device(s) in question (here, display substrate 400 and driver IC 420). For example, section 5.4.3 of *An Engineer's Handbook of Encapsulation and Underfill Technology* by Martin Bartholomew (Electrochemical Publications Ltd 1999, ISBN 090115038X), entitled "Methods for encapsulant removal (decapsulation)," describes such methods. Automated Production Equipment of Key Largo, Fla., USA sells rework equipment that can be used to remove and replace glob-topped, conformally-coated, or underfilled BGA parts; see the 2009 article "Reworking Plastic Parts" from APE. Wayne Chen, in "FCOB reliability evaluation simulating multiple rework/reflow processes" (IEEE Transactions on Components, Packaging, and Manufacturing Technology, Part C, vol. 19, no. 4, pp. 270-276, October 1996), pg. 272, left column, describes epoxy encapsulant used as an underfill between a flip-chip IC and the PCB on which it is mounted, then simulates rework of that underfill to determine the reliability effects due to rework. For a conventional display as shown in FIG. 9, after glob-top 421 is reworked or removed, metal layer 403 can be probed to pirate the decrypted data.

Furthermore, display signals are generally high-frequency. An RGB 1920×1080p60 display has a 373 MHz pixel rate (1920 columns×1080 rows×3 (RGB)×60 Hz=373 MHz). The pixel signals therefore produce large amounts of high-frequency noise. This noise can be inductively probed through glob-top, permitting piracy without any need to destroy or rework the display.

Additionally, some image data is transported compressed instead of, or in addition to, encrypted. Existing systems for image decompression are also vulnerable to attack.

There is a need, therefore, for a more secure approach for decrypting or decompressing image data.

SUMMARY OF THE INVENTION

According to an aspect of the present invention, there is provided a display for securely decrypting an encrypted image signal, comprising:

a) a display substrate having a display area, and a cover affixed to the display substrate;

b) a plurality of pixels disposed between the display substrate and cover in the display area for providing light to a user in response to a drive signal;

c) a plurality of control chiplets disposed between the display substrate and cover in the display area, each including a chiplet substrate separate and distinct from the display substrate, connected to one or more of the plurality of pixels, and adapted to receive a respective control signal and produce respective drive signal(s) for the connected pixel(s); and d) a decryption chiplet disposed between the display substrate and cover and that includes:
  i) a chiplet substrate separate and distinct from the display substrate;
  ii) means for receiving the encrypted image signal; and
  iii) a decryptor adapted to decrypt the encrypted image signal to produce a respective control signal for each of the control chiplets and transmit each control signal to the corresponding control chiplet.

According to another aspect of the present invention, there is provided a display for securely decrypting a plurality of encrypted local image signals, comprising:

a) a display substrate having a display area, and a cover affixed to the display substrate;

b) a plurality of pixels disposed between the display substrate and cover in the display area for providing light to a user in response to a drive signal;

c) a plurality of control chiplets disposed between the display substrate and cover in the display area, each including a respective chiplet substrate separate and distinct from the display substrate, each control chiplet connected to one or more of the plurality of pixels, adapted to receive a respective one of the encrypted local image signals and produce respective drive signal(s) for the connected pixel(s), and including a decryptor adapted to decrypt the respective encrypted local image signal to produce a corresponding drive signal for each of the connected pixel(s).

According to yet another aspect of the present invention, there is provided a display for securely decrypting and decompressing an image signal divided spatially into a plurality of algorithm blocks, comprising:

a) a display substrate having a display area, and a cover affixed to the display substrate;

b) a plurality of pixels disposed between the display substrate and cover in the display area for providing light to a user in response to a drive signal;

c) a plurality of control chiplets disposed between the display substrate and cover in the display area, each including a chiplet substrate separate and distinct from the display substrate, connected to one or more of the plurality of pixels, and adapted to receive a respective control signal corresponding to an algorithm block and produce respective drive signal(s) for the connected pixel(s) by decompressing the data in the received control signal; and d) a decryption chiplet adapted to receive an encrypted image signal, produce a respective control signal for each of the control chiplets and transmit each control signal to the corresponding control chiplet, the decryption chiplet being disposed between the display substrate and cover, and including a chiplet substrate separate and distinct from the display substrate and a decryptor adapted to decrypt the encrypted image signal to produce the respective control signals.

An advantage of this invention is a flat-panel display that requires puncturing encapsulation, possibly destroying the display in the process, to pirate decrypted data. In various embodiments, the number of points that must be probed to capture all the decrypted data is substantially larger than the number of points that must be probed on existing systems, greatly increasing the difficulty of pirating a full copy of the displayed content. In some embodiments, the contact pads on the decryption chiplet are away from the substrate, rather than towards the substrate as in BGA, CSP and flip-chip packages, making test probing and rework easier and less damaging, and reducing manufacturing cost. In some embodiments, the display can detect that piracy is occurring and deactivate or self-destruct to prevent further theft of data.

DETAILED DESCRIPTION OF THE INVENTION

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, systems and methods described herein. Other aspects of such algorithms and systems, and hardware or software for producing and otherwise processing the image signals involved therewith, not specifically shown or described herein, are selected from such systems, algorithms, components, and elements known in the art. Given the systems and methods as described herein, software not specifically shown, suggested, or described herein that is useful for implementation of any embodiment is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method(s) according to various embodiment(s).

Figure 1:
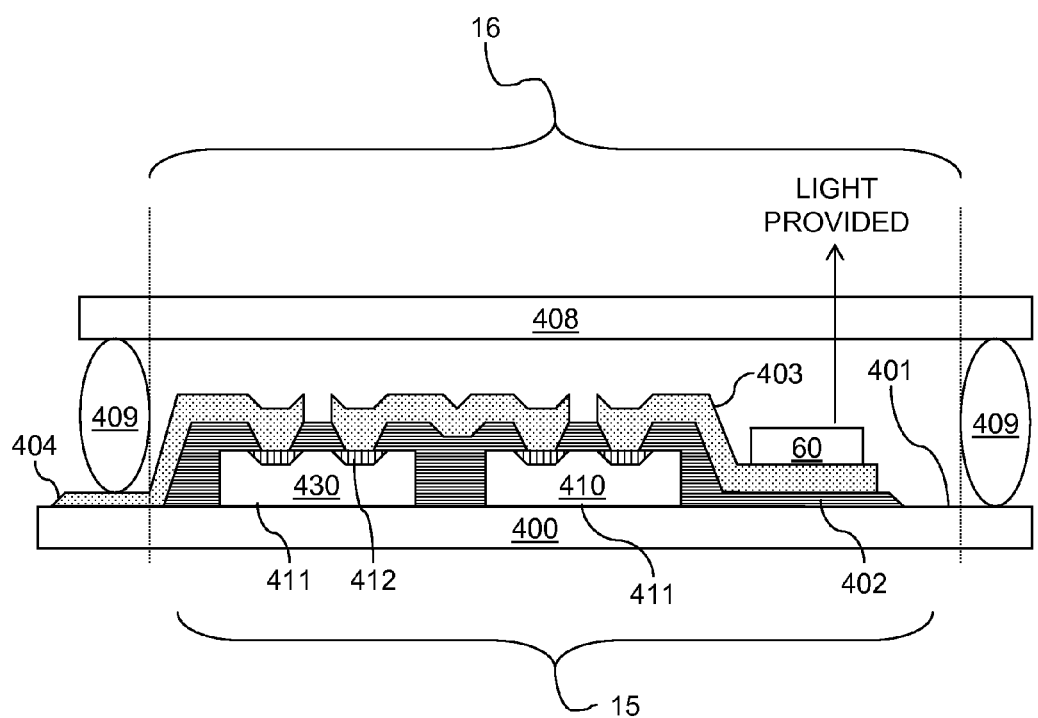
FIG. 1 is a cross-section of a display according to various embodiments.

FIG. 1 shows a display for securely decrypting of image signals. Display substrate 400 has display area 15 and cover 408 affixed to display substrate 400. A plurality of pixels 60 disposed between the display substrate 400 and cover 408 in display area 15 provide light to a user or other viewer of the display in response to a drive signal. For example, a pixel 60 can be an EL emitter, a light-emissive plasma cell, or a liquid crystal between crossed polarizers. A plurality of control chiplets 410 are disposed between the display substrate 400 and cover 408 in the display area 15, each including a chiplet substrate 411 separate and distinct from the display substrate 400 and connected to one or more of the plurality of pixels 60. The control chiplets 410 receive respective control signals and produce respective drive signal(s) for the connected pixel (s) 60. Pads 412 on control chiplets 410 are connected to pixels 60 by metal layer 403. Decryption chiplet 430 is also disposed between display substrate 400 and cover 408, i.e. within sealed area 16, and includes a chiplet substrate 411 separate and distinct from display substrate 400. In this figure, decryption chiplet 430 is within display area 15. Decryption chiplet 430 can also be outside display area 15 but still within sealed area 16. A plurality of decryption chiplets 430 can be disposed over the display substrate 400, in or out of display area 15.

To produce the drive signals from the control signals, control chiplets 410 can include conventional two-transistor, one-capacitor (2T1C) active-matrix drive circuits as known in the art, or passive matrix drive circuits. The drive signals can be voltages or currents, and can be time-modulated (e.g., pulse-width modulation, PWM), amplitude-modulated, or other modulation forms known in the art.

Decryption chiplet 430 includes pad 412 for making an electrical connection to one of the control chiplets through metal layer 403. Decryption chiplet 430 is advantageously disposed over display substrate 400 so that pad 412 is on the side of chiplet substrate 411 of decryption chiplet 430 farther from display substrate 400. In various embodiments, decryption chiplet 430 receives encrypted image data from outside sealed area 16 through one or more input electrode(s) 404. In other embodiments, decryption chiplet 430 receives the encrypted image data wirelessly using an antenna or cavity, or as data superimposed on power supply lines (not shown). In still other embodiments, Decryption chiplet 430 receives the encrypted image data from another decryption chiplet (not shown) in sealed area 16, or from a demultiplexer or source driver in sealed area 16, as will be described below. In still other embodiments, decryption chiplet 430 includes a light detector (e.g., a photocell) for receiving the encrypted image data optically from a transmitter or another chiplet in sealed area 16 or outside of scaled area 16.

Seal 409 holds display substrate 400 and cover 408 together. Seal 409 can be an encapsulant for affixing the cover to the substrate, and the encapsulant (seal 409), display substrate 400, and cover 408 can reduce moisture ingress into the area between the substrate and the cover. This is particularly advantageous when pixel 60 is an electroluminescent (EL) pixel. For example, seal 409, display substrate 400, and cover 408 can be substantially impermeable to moisture (e.g., they can be glass or metal). In another example, display substrate 400 and cover 408 can be glass, and seal 409 can be a continuous bead (or multiple beads joined together) of moisture-resistant adhesive, or two such beads, one next to the other around the perimeter of sealed area 16. In an embodiment with two beads, one bead forms an outer seal, and the other bead forms an inner seal at a substantially constant spacing away from the outer seal (e.g., two nested rectangles, the inner one smaller than the outer, or two concentric circles of different radii).

Figure 2:
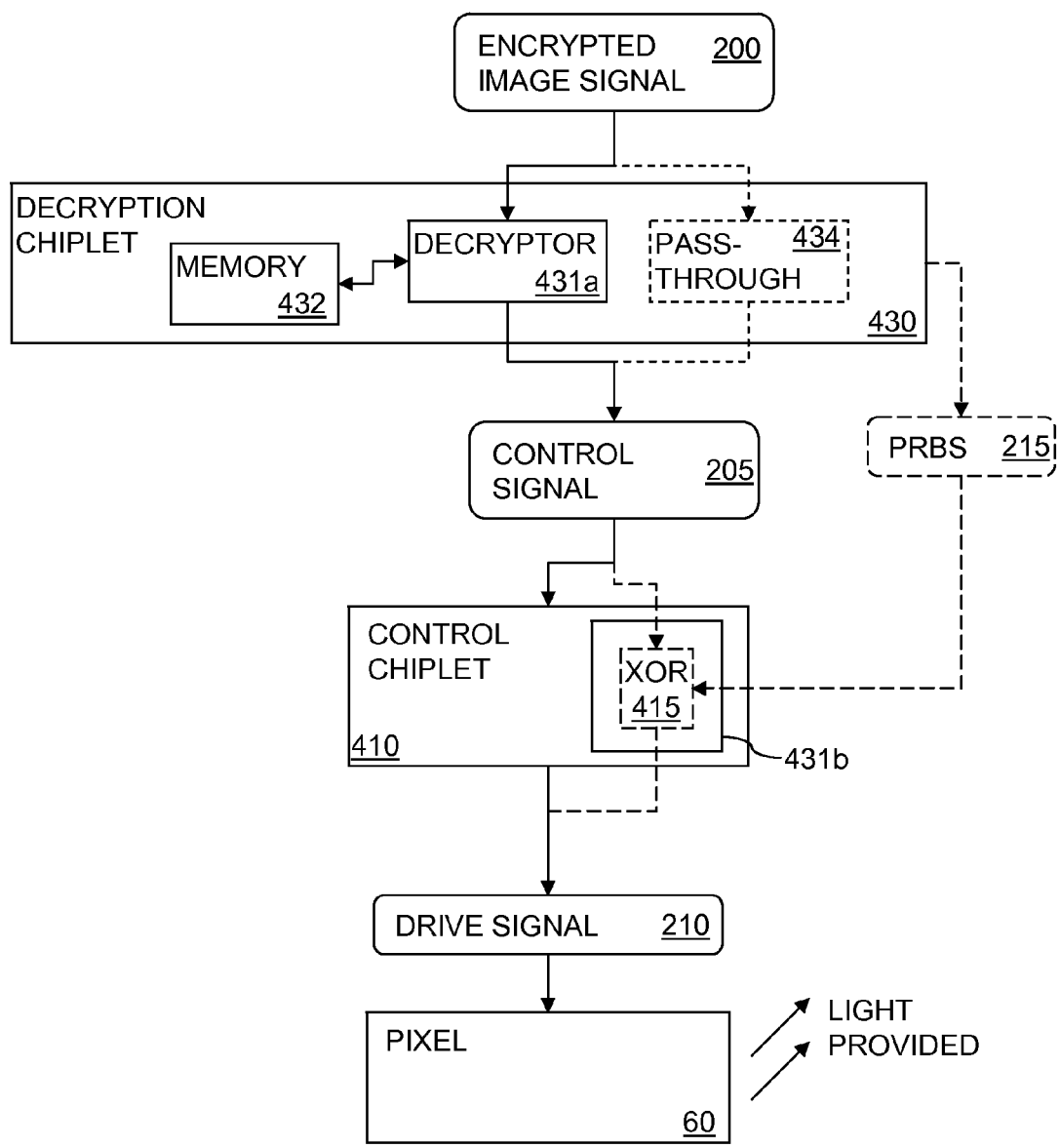
FIG. 2 is a functional block diagram of a display according to various embodiments.

FIG. 2 shows a functional block diagram of the system of FIG. 1. Rectangles represent parts or steps and rounded rectangles represent data items, values, or sets of values. Decryption chiplet 430 receives an encrypted image signal 200. Decryptor 431a in decryption chiplet 430 is a circuit or program that decrypts encrypted image signal 200 to produce a respective control signal 205 for each of the control chiplets 410. Each control signal 205 is then transmitted to the corresponding one of the control chiplets 410 via metal layer 403 (FIG. 1). The control chiplet then produces a drive signal 210 for each connected pixel 60. For clarity, this figure shows only one decryption chiplet 430, one control chiplet 410, and one pixel 60. In various embodiments, a plurality of each of these is provided.

When there are multiple decryption chiplets 430, each decryption chiplet 430 can be responsible for decrypting a portion of the encrypted image signal 200 (FIG. 2) divided in space (e.g., top half, bottom half), time (e.g., even frames, odd frames) or both (e.g., first field, second field of an interlaced display) from the portions decrypted by other decryption chiplets 430.

Decryptor 431a can perform HDCP decryption according to the HDCP standard, generating a pseudo-random bitstream (PRBS) and performing a bitwise exclusive-OR operation (XOR) between each bit of the encrypted image signal 200 and the corresponding bit of the PRBS. Decryptor 431a can also perform decryption of IDEA, RSA, AES (Rijndael), Twofish, or other codes or ciphers known in the art.

Alternatively, the XOR can be performed in the control chiplet 410 by XOR unit 415 to move the point of decryption even closer to the pixel 60. Decryption chiplet 430 can provide the encrypted image signal 200 corresponding to the pixel(s) 60 controlled by each control chiplet 410 as the control signal 205 for that control chiplet 410, e.g., using pass-through 434 (a wire, mux or other datapath through decryption chiplet 430). Decryption chiplet 430 then further provides the PRBS 215 to each control chiplet 410, and each control chiplet 410 receives the PRBS 215 and combines it with the control signal by XORing to produce the drive signal. Similarly, any encryption algorithm with key generation separate from decryption can be divided in this way, with key generation in the decryption chiplet 430 and decryption in the control chiplet 410. Decryption chiplet 430 can store a decryption key for decrypting the encrypted image signal. The decryption key can be stored in a volatile or non-volatile memory 432. When there is a plurality of decryption chiplets 430, each can store a respective unique decryption key in its respective memory 432.

In various embodiments, the display securely decrypts one or a plurality of encrypted local image signals. A control chiplet 410 includes decryptor 431b adapted to decrypt a received encrypted local image signal (e.g., control signal 205 from pass-through 434) to produce a corresponding drive signal for each of the connected pixel(s). Decryption chiplet 430 is adapted to provide a pseudo-random bitstream (PRBS 215) to one of the control chiplets (only one is shown here, for clarity). Decryptor 431b in the control chiplet receives PRBS 215 and combines it with control signal 205 to produce drive signal 210. Decryptor 431b includes XOR unit 415 to perform the XOR. XOR unit 415 can be implemented in various ways. For example, using four NAND gates, A xor B, denoted $A \oplus B$, can be computed as:

$$T = \overline{A \times B}$$

$$A \oplus B = \overline{\overline{A \times T} \times \overline{B \times T}}$$

In other embodiments, the display has a plurality of control chiplets 410. Each control chiplet includes a respective decryptor 431$b$, and each control chiplet decrypts the corresponding encrypted local image signal. Such embodiments can be used with encryption schemes other than PRBS/XOR encryption.

Figure 3:
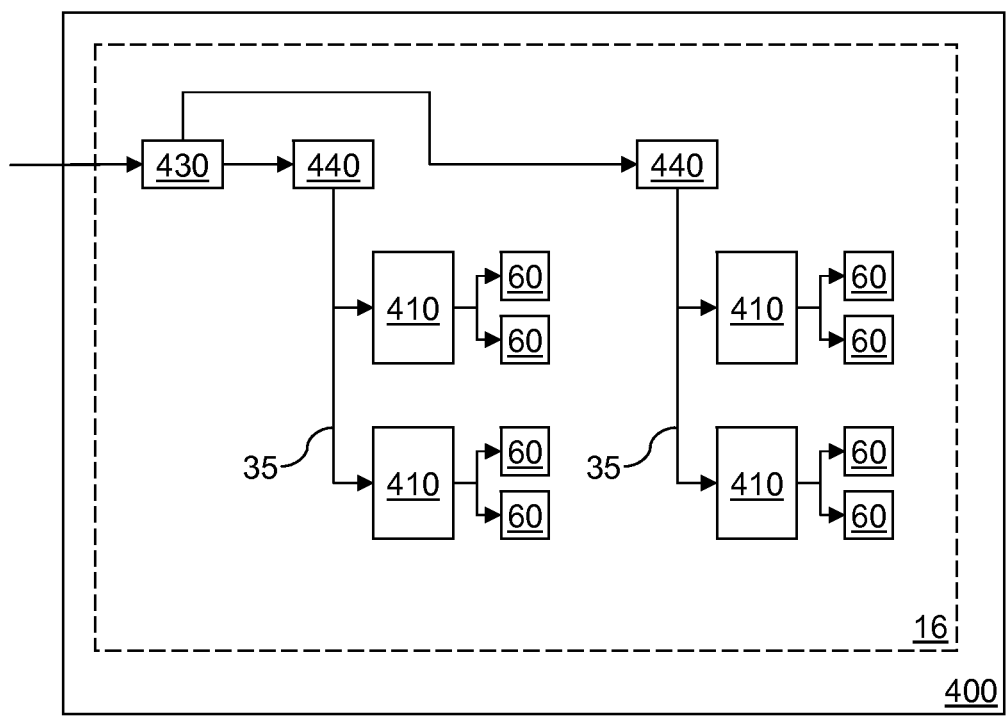
FIG. 3 is a plan view of a display having source drivers according to various embodiments.

FIG. 3 shows an embodiment of a display using source driver chiplets 440 disposed between display substrate 400 and cover 408 having respective chiplet substrates (411; see FIG. 1) separate and distinct from the display substrate 400, and located in sealed area 16. The display includes one or more data line(s) 35, each connected to one or more of the control chiplet(s) 410. Each source driver chiplet is connected to a decryption chiplet 430 and to one or more of the data line(s) 35 for communicating the control signal(s) 205 (FIG. 2) from the corresponding decryption chiplet 430 to the corresponding control chiplet(s) 410 using the data line(s). The source driver chiplets 440 are similar in function to conventional chip-on-flex (CoF) or chip-on-glass (CoG) source drivers, but are disposed between display substrate 400 and cover 408 in sealed area 16, making them advantageously more resistant to attack. The source driver chiplets 440 can be located in or out of display area 15 (FIG. 1). The source driver chiplets 440 can provide, for example, voltage or current control signals, time- or amplitude-modulated.

Figure 4:
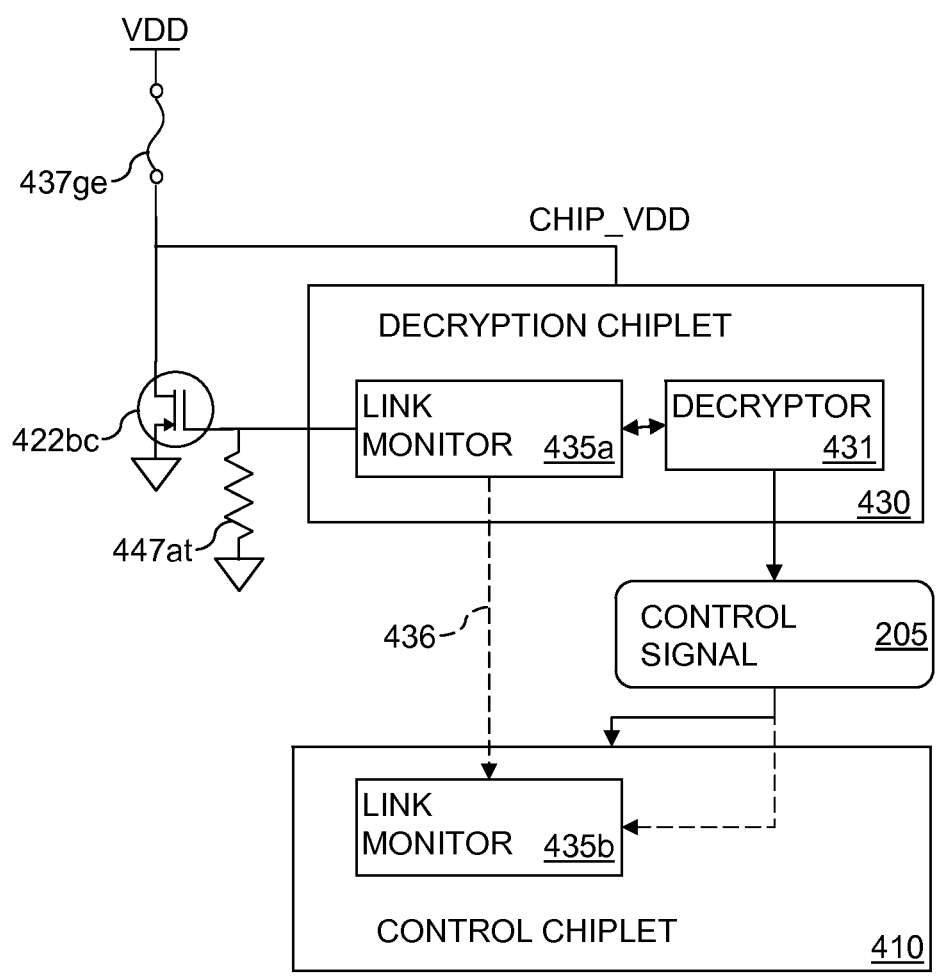
FIG. 4 is a functional block diagram of a display having link-integrity monitoring according to various embodiments.

FIG. 4 shows a functional block diagram of link integrity monitoring between decryption chiplet 430 and a control chiplet 410. Control chiplet 410 can be a selected one of the control chiplets 410 on a display. Link integrity monitoring can be performed between one or more decryption chiplet(s) 430 and one or more control chiplet(s) 410. Decryption chiplet 430 and control chiplet 410 include respective monitors 435$a$, 435$b$ that can each include a respective link-integrity monitoring circuit. The monitors 435$a$, 435$b$ determine whether communications between the decryption chiplet 430 and control chiplet 410 are being monitored, for example by an attacker trying to snoop on unencrypted data from the connection between them. In order to do this, an attacker has to break into the sealed area 16 without destroying the display, but if an attacker manages to do so, the monitors 435$a$, 435$b$ provide a second line of defense.

When the monitors 435$a$, 435$b$ in the decryption chiplet 430 and control chiplet 410 determine communications between those chiplets are being monitored, the monitor 435$a$ of the decryption chiplet 430 prevents the decryptor 431$a$ from producing the control signals 205, causes the decryptor 431$a$ to produce control signals 205 using a security signal instead of the encrypted image signal 200 (e.g., so that the display will show a fixed message such as "no cr4ck0rz"), or causes the decryption chiplet 430 to self-destruct. In an embodiment, decryption chiplet 430 self-destructs by closing transistor 422$bc$ (in this example, by providing a voltage above threshold on the gate of transistor 422$bc$), which then shorts power (VDD) to ground through fuse 437$ge$ powering the entire decryption chiplet 430 (CHIP_VDD). The high current blows fuse 437$ge$, causing CHIP_VDD to open and decryption chiplet 430 to lose power. Optional pulldown resistor 447$at$ keeps the $V_{gs}$ of transistor 422$bc$ below the threshold voltage when the gate of transistor 422$bc$ is not actively driven, e.g., during power-up and power-down of decryption chiplet 430. Resistor 447$at$, transistor 422$bc$, and fuse 437$ge$ can be integrated into decryption chiplet 430 or external to it, e.g., on the display substrate using TFTs or in another chiplet. Fuse 437$ge$ can be a metal or ITO trace on the display surface, or a metal or polysilicon trace in a chiplet. Fuse 437$ge$ and transistor 422$bc$ are selected so that fuse 437$ge$ will blow quickly when transistor 422$bc$ conducts, since transistor 422$bc$ will become non-conducting when its gate drive, supplied by CHIP_VDD, is removed by the fuse's blowing. Alternatively, a high capacitance to ground or another rail can be attached to the gate of transistor 422$bc$ to hold the transistor active until fuse 437$ge$ has fully blown.

Monitors 435$a$, 435$b$ can determine whether communications are being monitored in various ways. In one embodiment, monitors 435$a$, 435$b$ measure the time delay of signal propagation of control signals from the decryption chiplet to the control chiplets. Passive snooping, contact or non-contact, will add either capacitive or inductive load to the line, increasing the propagation delay. A step change in propagation delay can indicate a probe was placed on or near a line.

In another embodiment, monitors 435$a$, 435$b$ in the decryption and control chiplets are connected by electrical connection 436. The link-integrity-monitoring circuits include circuitry to measure the impedance (or resistance, which is a special case of impedance) of electrical connection 436, e.g., by time-domain reflectometry (TDR) or time-domain transmissometry. Monitor 435$b$ can include a fixed termination resistor matching the characteristic impedance of electrical connection 436. Monitor 435$a$ can transmit a pulse along electrical connection 436 and detect any reflections. Any reflections indicate the impedance of electrical connection 436 does not match of the termination resistor in monitor 435$b$, indicating possible passive snooping.

In another embodiment, protection is provided against any breach of the sealed area 16, even if noninvasive active probing is used instead of passive probing. Impedance measurement is used as described above, and electrical connection 436 includes a wire having impedance that changes with exposure to an external environment such as moisture or oxygen. When sealed area 16 is compromised by an attacker, electrical connection 436 will begin to change impedance due to the ingress of the external environment into sealed area 16. This change in impedance can be measured e.g., with TDR as described above. A wire that changes impedance can be formed of calcium. Calcium is conductive, but reacts with water to form CaO and $Ca(OH)_2$, both of which are non-conductive. Therefore, as the calcium is exposed to moisture, its impedance will rise. In one embodiment, electrical connection 436 includes two metal segments connected to monitors 435$a$ and 435$b$, respectively, but not directly connected to each other. The segments are connected to each other by a patch, wire, or other shaped area of calcium. The metal segments and the calcium have the same electrical impedance as manufactured, so a TDR analysis of the wire shows no discontinuities. When exposed to moisture, the impedance of the calcium area changes, introducing an impedance discontinuity in electrical connection 436 that can be measured by TDR. Other alkaline earth metals, e.g., magnesium, can be used instead of calcium. For electrical connections that change impedance at low frequencies or DC (i.e., electrical connections that change resistance), simple electrical resistance measurement (e.g., measuring the voltage across connection 436 while applying a fixed current or the current for a fixed voltage) can be used instead of, or in addition to, TDR.

Figure 5:
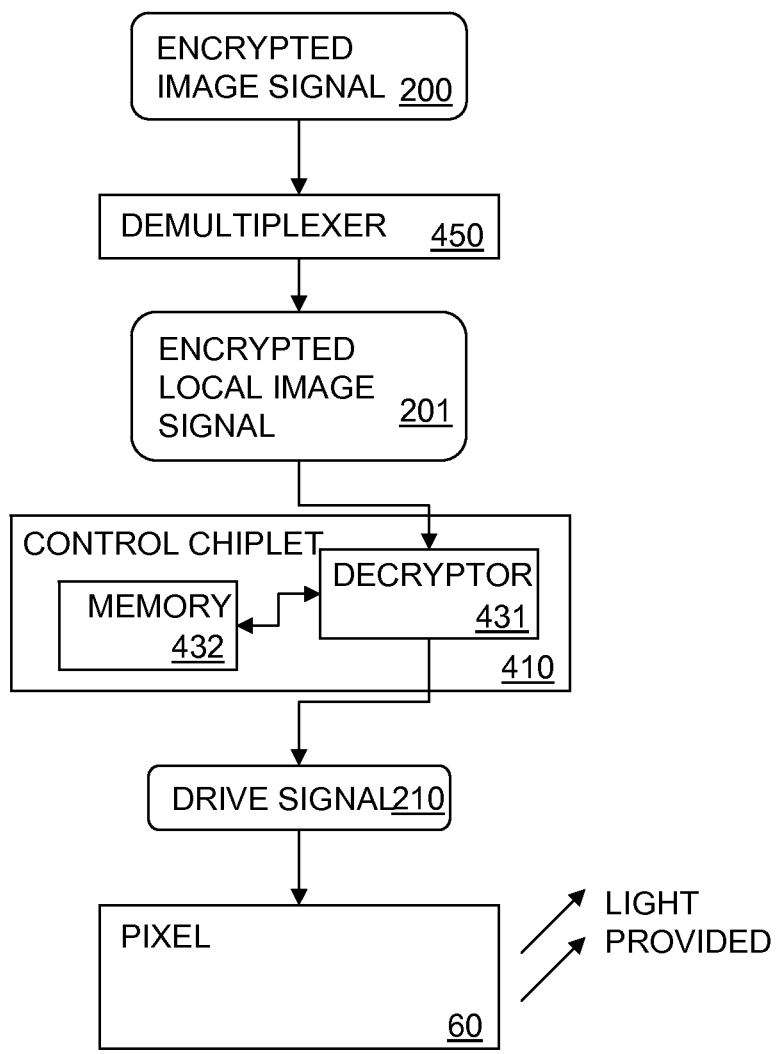
FIG. 5 is a functional block diagram of a display having distributed decryption according to various embodiments.

FIG. 5 shows a functional block diagram of an alternative embodiment in which the decryptors 431$a$ are placed in the control chiplets 410. A display according to this embodiment includes a plurality of control chiplets 410 disposed between the display substrate 400 and cover 408 as above. Each control chiplet 410 receives a respective encrypted local image signal 201 and produces respective drive signal(s) 210 for the connected pixel(s) 60. Each control chiplet 410 includes a decryptor 431*a* adapted to decrypt the encrypted local image signal 201 to produce a corresponding drive signal 210 for each of the connected pixel(s) 60. Control chiplet 410 can also include a memory 432 as described above.

Demultiplexer 450 can be used to receive the encrypted image signal 200 and produce the respective encrypted local image signals 201 by dividing encrypted image signal 200 in space or time, as described above. Demultiplexer 450 receives a selected number of input signals and divides them into a larger number of output signals by undoing time- or frequency-division multiplexing performed to produce the input signals. This is particularly advantageous for systems such as HDCP in which the frame and line timing are not encrypted, which simplifies demultiplexing. Demultiplexer 450 can route each line of data from the input signal to an appropriate control chiplet 410 without having to decrypt the input signal first. Each control chiplet 410 advantageously decrypts the corresponding encrypted local image signal 201 without reference to the encrypted local image signal(s) 201 distributed to other control chiplet(s) 410, reducing interconnect requirements and increasing redundancy and security.

In some display systems, image signals are compressed in addition to being encrypted. Image data can be compressed with JPEG, an MPEG standard, ZIP, or other compression types known in the art. Compression can be performed before, after, or as part of encryption. For example, OpenSSH compresses data before encrypting it.

Figure 6:
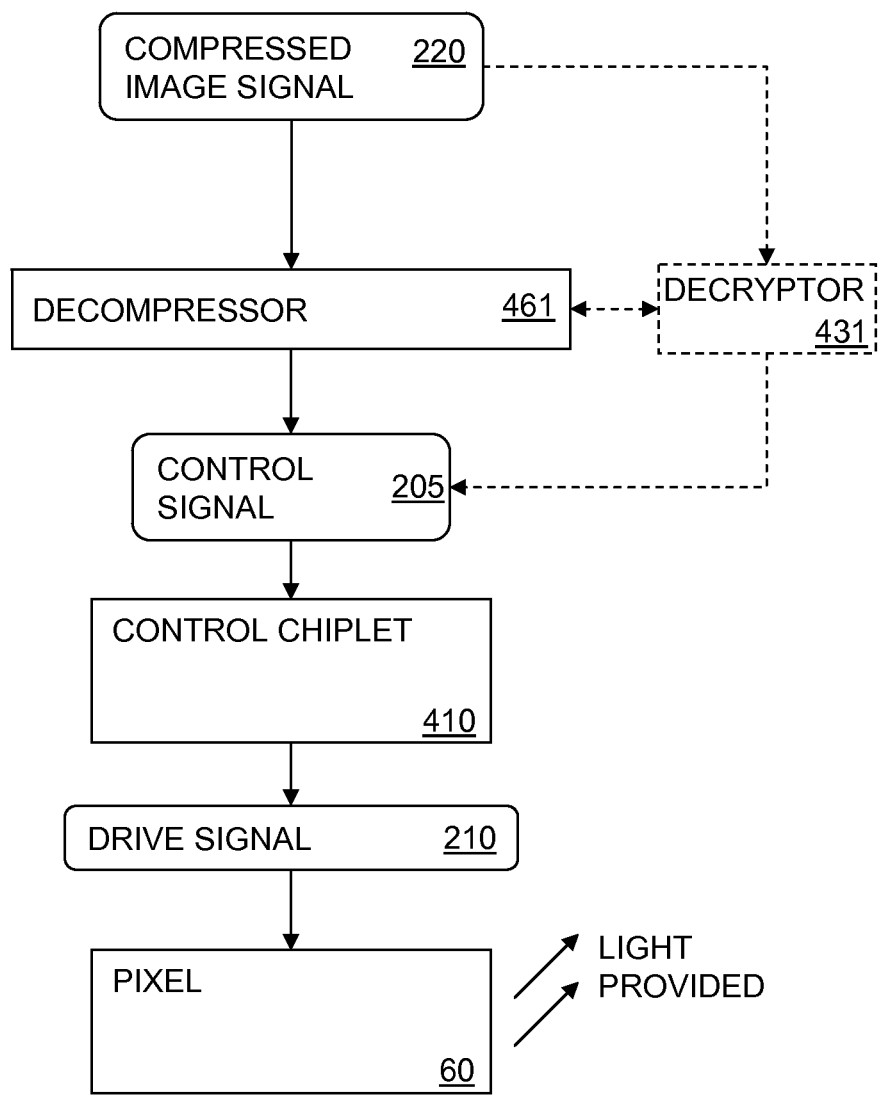
FIG. 6 is a functional block diagram of a display having decompression according to various embodiments.

Referring to FIG. 6, in one embodiment, a display is provided with a plurality of control chiplets 410 as described above. Decompressor 461 is a circuit or program that receives compressed image signal 220 and decompresses it to produce a corresponding control signal 205 for each of the control chiplets 410. Drive signal 210 and pixel 60 are as described on FIG. 2.

Decompressors 461 can advantageously reduce the data rate of image data transmission, reducing the power required to transmit image data over cables or wirelessly. For example, in a billboard, cinema, or other large-screen display, data can be compressed for transmission, permitting reduced data rates and lower power consumption. Alternatively, compression and multiplexing (and corresponding decompression and demultiplexing on the display) can be combined to permit data for several portions of a display to be transmitted over a single cable rather than multiple cables, reducing system cost and weight. Moreover, as discussed further below, block decompression using decompressors 461 matches the block structure of common video compression algorithms such as MPEG-2, and so provides a more efficient way of decrypting such video data.

Decompressor 461 can include circuitry or logic for decompressing data compressed using various techniques. These techniques, which can be lossy or lossless can include run-length encoding (RLE), Huffman coding, LZW compression (e.g., as used in GIF image files, and as described in U.S. Pat. No. 4,558,302), discrete cosine transform (DCT) compression (e.g., as used in JPEG image files), wavelet transform compression (e.g., as used in JPEG2000 image files), MPEG-2 video (ISO/IEC 13818-2, also used for ATSC digital broadcast television in the US), MPEG-4 part 2 video, MPEG-4 part 10 (AVC) video, Theora video, or VP8 (WebM) video. Decompressor 461 can also include circuitry or logic for unpacking compressed data from a container format such as Matroska, Ogg, JFIF, MPEG-PS, ASF, or QuickTime. The decompression algorithms can be implemented as programs on a CPU or microprocessor, in logic on an ASIC, FPGA, PLD, or PAL, or a combination. Decompression is described further below.

In various embodiments, compressed image signal 220 is also encrypted. That is, compression and encryption are performed, in either order, to provide image signal 220. Decryptor 431*a* decrypts image signal 220. Decryption of the encrypted compressed image signal 220 can occur before, after or as part of the decompression, either within the decompressor 461 or in a separate circuit or chiplet (not shown). In an embodiment, decryption (e.g., of HDCP-encrypted data) occurs first, and the decrypted image signal is decompressed to provide control signals 205.

Figure 7:
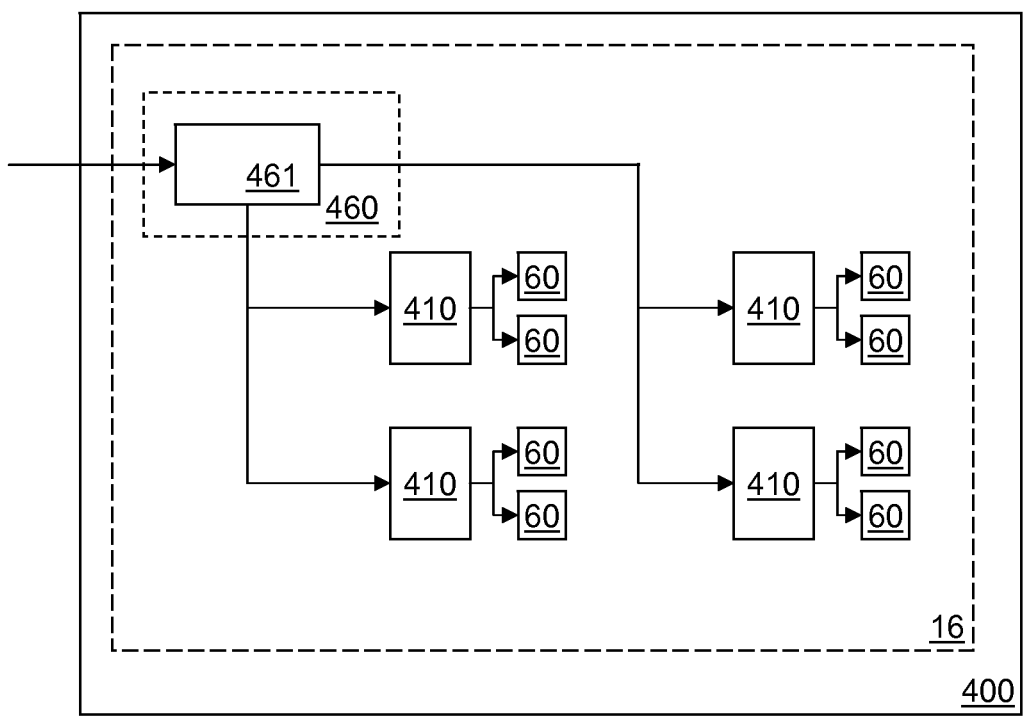
FIG. 7 is a plan view of a display having decompression according to various embodiments.

FIG. 7 shows an embodiment in which the decompressor 461 is located in a decompression chiplet 460 having a chiplet substrate (411, FIG. 1) separate and distinct from the display substrate 400. Sealed area 16 and pixels 60 are as shown in FIG. 3.

Figure 8:
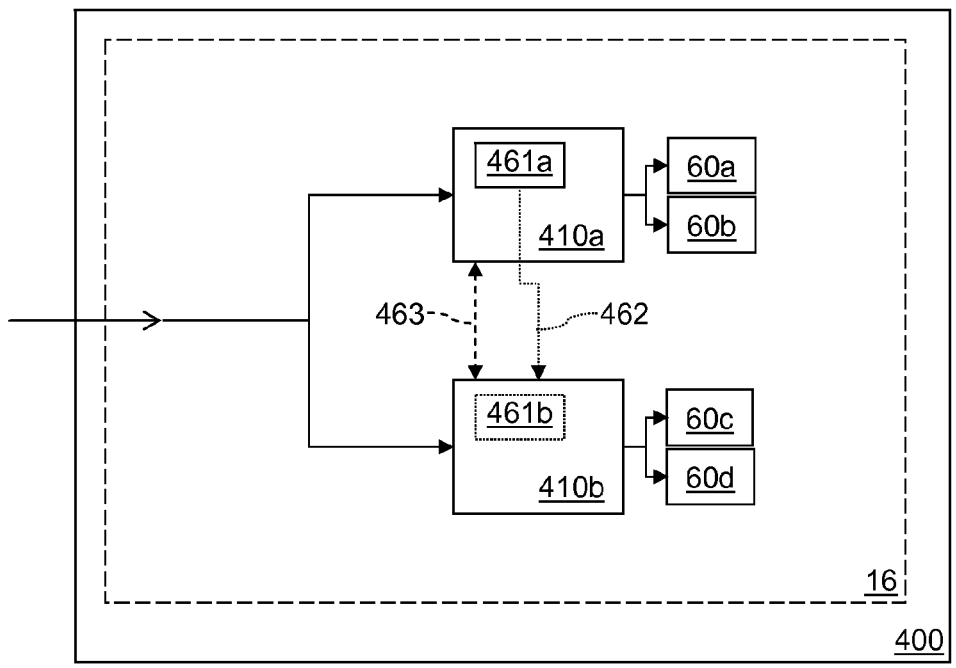
FIG. 8 is a plan view of a display having decompression according to another embodiment.
Figure 9:
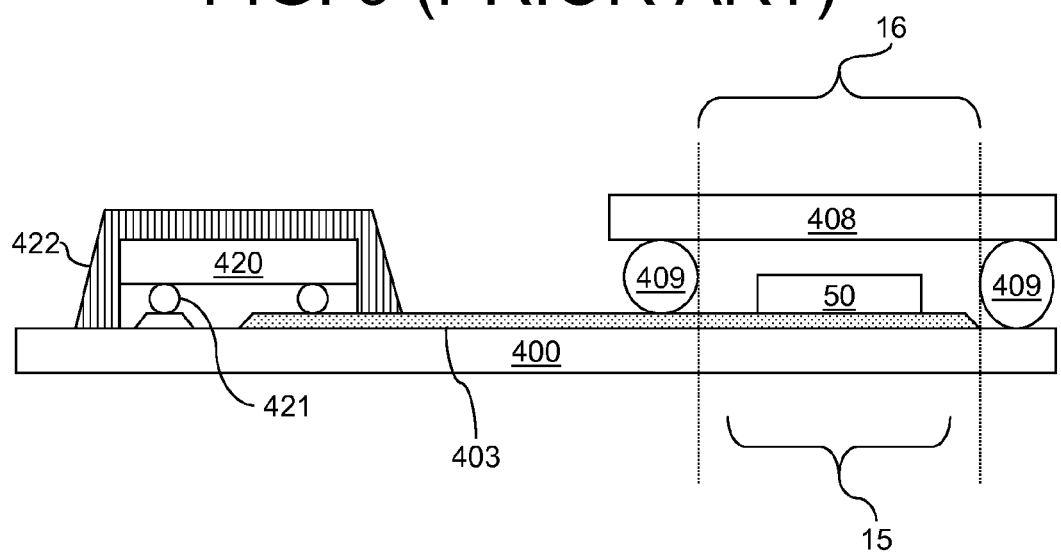
FIG. 9 is a cross-section of a conventional display using glob-topped driver ICs outside the display area.

FIG. 8 shows an embodiment in which decompressors 461*a*, 461*b* are located in control chiplets 410*a*, 410*b*, respectively. Sealed area 16 and pixels 60 are as shown in FIG. 3. Multiple decompressors can also be provided in a control chiplet. Alternatively, a selected control chiplet (e.g., 410*a*) can include a decompressor 461*a*, and another selected control chiplet (e.g., 410*b*) can be without a decompressor. Decompressed data are then communicated over link 462 to the other control chiplet(s) (e.g., 410*b*) on the display. Pixels 62*a*, 62*b*, 67*a*, 67*b* are as shown in FIG. 3 (pixel 60).

In various embodiments, link 463 transmits compressed or decompressed, encrypted or decrypted image data between control chiplets 410*a* and 410*b*. In an example, control chiplets 410*a* include respective decompressors 461, each for performing MPEG-2 decompression on macroblocks having pixel data for the respective pixels connected to control chiplets 410*a*, 410*b*. The MPEG-2 standard includes motion compensation, in which a spatially-contiguous group of pixels that translates across the image but does not change significantly in code values can be represented only once as full data. Subsequent occurrences of that group in different positions are represented using motion vectors indicating the new location of the group. Control chiplets 410*a*, 410*b* communicate motion vectors and image data across link 463 to perform motion compensation. In a specific example, pixels 62*a* and 62*b* are above pixels 67*a* and 67*b*. The image being displayed is a video of a landscape scene, and the camera is panning up. Therefore, groups of pixels are moving from the top towards the bottom of the display. In response to the decompressed image data, Control chiplet 410*a* transmits pixel values for pixels 62*a* and 62*b* over link 463 to control chiplet 410*b*. Control chiplet 410*b* then uses those pixel values to drive pixels 67*a* and 67*b* with the same image as pixels 62*a* and 62*b* were formerly displaying. In this way smooth panning is provided, and pixels are transmitted only to chiplets that need them. Each control chiplet can be connected to no, one, or more than one other control chiplets for transmitting data for motion compensation. Each control chiplet can be connected to adjacent control chiplets (i.e., those with pixels adjacent to the pixels belong to the control chiplet in question) or non-adjacent control chiplets. In various embodiments, control chiplets are arranged in rows and columns, and each control chiplet is connected to the four adjacent chiplets (above, below, left, and right), or is connected to the eight adjacent chiplets (those four, plus above-left, below-left, above-right, and below-right).

As discussed above, various decompression algorithms are block-based. That is, they operate on blocks of data, each of which corresponds to a particular spatial extent of the displayed image. These blocks can be overlapping (e.g., JPEG2000 subbands) or disjoint (e.g., MPEG-2 macroblocks).

Hereinafter, "control unit" refers to a chiplet or circuit (e.g., TFT) on the display, as described above, that performs a decryption or decompression function, e.g., decryption chiplet 430 (FIG. 2), control chiplet 410 (FIG. 5) including decryptor 431*a* (FIG. 5), or decompressor 461 (FIG. 6). "Algorithm block" refers to a block of data (e.g., a subband or macroblock, as described above) that is input to a control unit (e.g., control chiplet 410, FIG. 6).

In various embodiments, each control unit processes data from one algorithm block at a time. Different control units receive different algorithm blocks. For example, with MPEG-2 video, each control unit receives DCT coefficients for a respective 8×8 pixel block, and performs the inverse DCT (IDCT) to produce the 8×8 pixel values for display on the 64 corresponding pixels. For an RGB display, each control unit receives a respective macroblock including two blocks of Y (luma) data and one block each of chroma (Cb, Cr) data. The control unit computes the pixel data for Y, Cb, and Cr using IDCT on these blocks, then converts YCbCr to RGB for display. For the compression system described in U.S. Pat. No. 6,668,015, the disclosure of which is incorporated by reference herein, each control unit receives a respective fixed-length compressed data block. Each control unit receives and processes one, or more than one, algorithm block at a time. In an embodiment, each algorithm block is sent to exactly one control unit. In another embodiment, each algorithm block is sent to more than one control unit, and the results from each control unit are combined (e.g., by voting).

As discussed above, dividing the algorithm blocks among the control units advantageously reduces the bandwidth and computational power required in each control unit. In a display, when an algorithm block of video data is decrypted or decompressed in a control unit (e.g., a chiplet) very close to the pixels for which that algorithm block is intended, update speed of the display can be increased and power dissipation can be spread across the display, thereby reducing peak display temperature and improving display lifetime. Additionally, control units on the display can still operate and display content even if other control units on the display are damaged. This permits longer lifetime for large displays and billboards, which are costly to repair and even more costly to replace. Also, as discussed above, localized processing greatly increases the difficulty for an attacker to capture the entire video signal.

Figure 10:
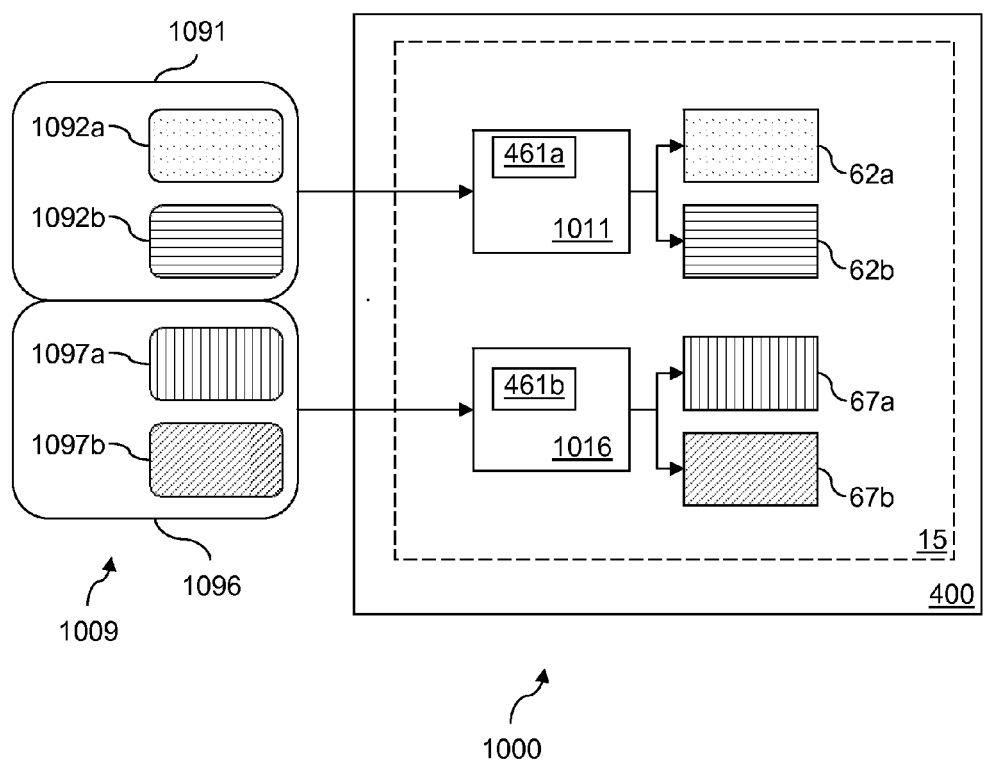
FIG. 10 shows a display adapted to perform distributed decompression according to various embodiments.

FIG. 10 shows a display adapted to perform distributed decompression according to various embodiments. Display 1000 decompresses image signal 1009 divided spatially into a plurality of algorithm blocks. By "divided spatially" it is meant that the content of image signal 1009 includes representations of desired image content for regions of the display having specific spatial extents (e.g., pixel coordinates). The signal itself, as it is a signal, has no spatial extent. The content of the signal can, for example, include image content for the 8×8-pixel algorithm block from row 0, column 0 (represented as (0,0)) of the display to (7,7), and separately for the algorithm blocks from (8,0) to (15,7), (0,8) to (7,15), and likewise across the whole display. It is not required that all spatial divisions in image signal 1009 have the same size. For example, in JPEG2000, subbands have progressively smaller sizes as compression proceeds. The image signal can also tile the display in non-equal algorithm blocks, e.g., one algorithm block for the entire left-hand half of the display (2m×n), one algorithm block for the top right (m×n), and one algorithm block for the bottom right (m×n). Algorithm blocks can also contain non-contiguous pixels; for example, the standard Adam7 interlace order for PNG images divides the image into seven algorithm blocks (passes), only the last of which includes any contiguous pixels. Each pass is a successively finer spatial subsampling of the image. This provides a recognizable, though blocky, image before most of the PNG file has been loaded into a viewing program.

In this example, algorithm blocks 1091, 1096 are shown, but any number≥1 of algorithm blocks can be used. Each algorithm block includes data to be decompressed and provided to an identified area of the display, as discussed above. Display substrate 400 has display area 15, and cover 408 (FIG. 1) affixed to display substrate 400, as discussed above.

A plurality of pixels (here, pixels 62*a*, 62*b*, 67*a*, 67*b*) is disposed between display substrate 400 and cover 408 in display area 15 for providing light to a user in response to a drive signal, as discussed above. In an embodiment, each pixel 62*a*, 62*b*, 67*a*, 67*b* is an EL emitter. A plurality of control units (here, control units 1011, 1016) are disposed between display substrate 400 and cover 408 in display area 15. Each control unit is connected to one or more of the plurality of pixels. In this example, control unit 1011 is connected to pixels 62*a*, 62*b*, and control unit 1016 is connected to pixels 67*a*, 67*b*. Any number of control units can be used, and each can be connected to any number of pixels. Each control unit 1011, 1016 is adapted to receive an algorithm block. In this example, control unit 1011 receives algorithm block 1091 and control unit 1016 receives algorithm block 1096. Each control unit 1011, 1016 produces respective drive signal(s) for the connected pixel(s) (pixels 62*a*, 62*b* for control unit 1011; pixels 67*a*, 67*b* for control unit 1016) by decompressing the data in the received algorithm block (algorithm blocks 1091, 1096, respectively).

In various embodiments, control units 1011, 1016 include decompressors 461*a*, 461*b*, respectively, each for receiving a compressed image signal of one algorithm block, and producing corresponding drive signals for the attached pixels. Examples of decompressors are given above.

In various embodiments, each control unit 1011, 1016 includes a respective control chiplet having a chiplet substrate 411 (FIG. 1) separate and distinct from display substrate 400, as discussed above with reference to FIG. 6 and below with reference to FIG. 11. That is, the circuitry of control units 1011, 1016 is implemented on respective control chiplets 410 (FIG. 6).

The hatch patterns in FIG. 10 indicate the correspondence between the spatial arrangement or layout of pixel data values and the spatial layout of light provided to the user in various embodiments. Algorithm block 1091 includes pixel data 1092*a*, 1092*b*, which respectively correspond to pixels 62*a*, 62*b*. Algorithm block 1096 includes pixel data 1097*a*, 1097*b*, which respectively correspond to pixels 67*a*, 67*b*. Pixel data 1092*a*, 1092*b*, 1097*a*, 1097*b* are adjacent in a single column, as are pixels 62*a*, 62*b*, 67*a*, 67*b*, respectively. In this and other embodiments, the spatial layout of pixels on display 1000 corresponds to the spatial layout of the algorithm blocks and of the pixel data in the algorithm blocks.

In various embodiments, the spatial layout of the control units corresponds to the spatial layout of the algorithm blocks. Algorithm blocks 1091, 1096 are adjacent in a single column. Control units 1011, 1016, respectively, are also adjacent in a single column.

By corresponding spatial layouts, it is not meant that display 1000 is required to have pixel spacings or exact positions that are indicated in the image signal. Instead, the control units that process the data are divided and arranged so that each algorithm block is processed by one control unit. That control unit can include one or more components (e.g., TFT circuits or chiplets), but each algorithm block is processed by a control unit recognizably distinct from the other control units. In some embodiments, control units share data (e.g., for motion compensation, as described above); this does not mean they are not recognizably distinct from each other. In other embodiments of display 1000, the spatial layouts of the pixels or control units do not correspond to the pixel data or algorithm blocks of the input signal.

Figure 11:
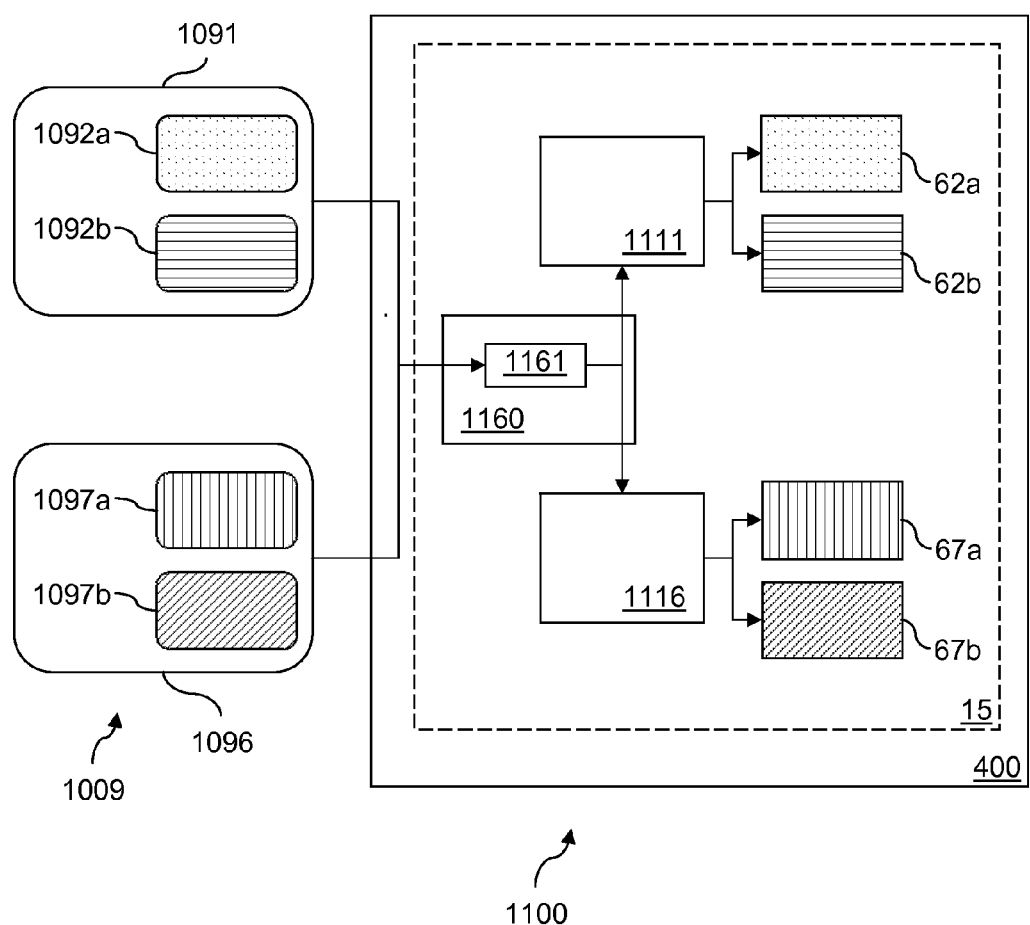
FIG. 11 shows a display adapted to securely decompress an image signal according to various embodiments.

FIG. 11 shows display 1100 that securely decompresses image signal 1009 according to various embodiments. Display substrate 400, display area 15, cover 208 affixed to display substrate 400, and pixels (e.g., 62a, 62b, 67a, 67b) disposed between display substrate 400 and cover 408 in display area 15 for providing light to a user in response to a drive signal are as shown in FIG. 10. Algorithm blocks 1091, 1096 and pixel data 1092a, 1092b, 1097a, 1097b are as shown in FIG. 10.

Control chiplets 1111, 1116 are disposed between display substrate 400 and cover 408 in display area 15. Each control chiplet 1111, 1116 includes a chiplet substrate 411 (FIG. 1) separate and distinct from display substrate 400 and is connected to one or more of the plurality of pixels (here, pixels 62a, 62b for chiplet 1111, and pixels 67a, 67b for chiplet 1116). Each control chiplet 1111, 1116 is adapted to receive a respective control signal and produce respective drive signal(s) for the connected pixel(s), as discussed above.

Decompressor 1161 receives a compressed image signal 1009, produces a corresponding control signal for each of the control chiplets 1111, 1116, and transmits each corresponding control signal to the corresponding one of the control chiplets 1111, 1116.

In various embodiments, decompressor 1161 is in decompression chiplet 1160. Decompression chiplet 1160 has a chiplet substrate 411 (FIG. 1) separate and distinct from display substrate 400. In other embodiments, decompressor 1161 is in one of the control chiplets 1111, 1116. In still other embodiments, decompressor 1161 is implemented using TFT electronics deposited on or over display substrate 400.

Figure 12:
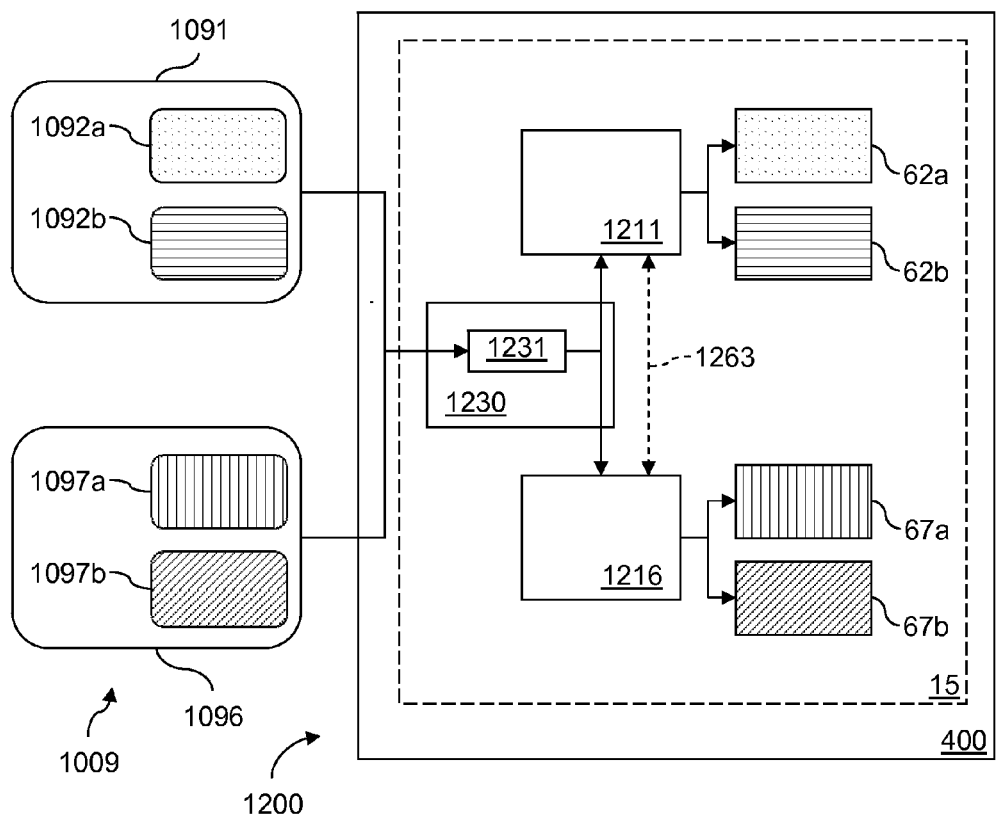
FIG. 12 shows a display adapted to securely decrypt and decompress an image signal divided spatially into a plurality of algorithm blocks according to various embodiments.

Referring to FIG. 12, in various embodiments, display 1200 securely decrypts and decompresses an image signal divided spatially into a plurality of algorithm blocks, as described above. Display substrate 400, display area 15, cover 408, and pixels 62a, 62b, 67a, 67b are as described above. Image signal 1009, algorithm blocks 1091, 1096, and pixel data 1092a, 1092b, 1097a, 1097b are as described above.

A plurality of control chiplets (e.g., 1211, 1216) are disposed between display substrate 400 and cover 408 in display area 15. Each control chiplet 1211, 1216 includes a chiplet substrate 411 (FIG. 1) separate and distinct from the display substrate. Each control chiplet 1211, 1216 is connected to one or more of the plurality of pixels (62a, 62b; 67a, 67b respectively), as described above. Each control chiplet 1211, 1216 is adapted to receive a respective control signal corresponding to an algorithm block 1091, 1096 (respectively) and produce respective drive signal(s) for the connected pixel(s) by decompressing the received control signal, i.e., by decompressing the data in the received algorithm block, also as described above.

Decryption chiplet 1230 is adapted to receive the encrypted image signal, produce a respective control signal for each of the control chiplets 1211, 1216 and transmit each control signal to the corresponding control chiplet 1211, 1216. Decryption chiplet 1230 is disposed between the display substrate and cover and includes a chiplet substrate 411 (FIG. 1) separate and distinct from display substrate 400. Decryption chiplet 1230 also includes decryptor 1231 adapted to decrypt the encrypted image signal to produce the respective control signals, as discussed above.

This embodiment provides secure decryption within the encapsulated area of the display, increasing security and making attack more difficult. By decrypting first and then decompressing in individual control chiplets, it makes use of the inherent parallelism in block-based compression algorithms. This provides efficient decompression with secure decryption. By decompressing in parallel, each control chiplet can use a lower clock frequency than a centralized decompressor would. This saves power, which rises in CMOS with frequency.

In other embodiments, decryption and decompression are performed on control chiplets 1211, 1216. These embodiments are particularly useful with block ciphers, which encrypt a block at a time. For example, the Data Encryption Standard (DES) encrypts 64-bit blocks, and the Advanced Encryption Standard (AES) encrypts 128-bit blocks. Data can be demultiplexed as described above for transmission to control chiplets 1211, 1216.

In various embodiments, link 1263 transmits compressed or decompressed, encrypted or decrypted image data between control chiplets 1211, 1216. This is described above with reference to link 463 (FIG. 8). Uses for the link include motion compensation and processing image signals when the block size of the decompression algorithm is different from the block size of the decryption algorithm (the sizes can also be the same).

Displays, and specifically EL displays, can be implemented on a variety of substrates with a variety of technologies. For example, EL displays can be implemented using amorphous silicon (a-Si) or low-temperature polysilicon (LTPS) on glass, plastic or steel-foil substrates. In various embodiments, decryptor 431a (FIG. 2), memory 432 (FIG. 2), monitors 435a, 435b (FIG. 4), demultiplexer 450 (FIG. 4), decompressor 461 (FIG. 6), or other functions described above are implemented using thin-film transistors (TFTs) on a backplane. These transistors can be implemented in various thin-film technologies such as low-temperature polysilicon (LTPS), amorphous-silicon, or zinc oxide (ZnO). In other embodiments, an EL display as described above is implemented using chiplets, which are control elements distributed over a substrate. A chiplet is a relatively small integrated circuit compared to the display substrate and includes a circuit including wires, connection pads, passive components such as resistors or capacitors, or active components such as transistors or diodes, formed on an independent substrate. Chiplets are separately made from the display substrate and then applied to the display substrate. Details of processes for making chiplets can be found, for example, in U.S. Pat. Nos. 6,879,098; 7,557,367; 7,622,367; US20070032089; US20090199960 and US20100123268, the disclosures of all of which are incorporated herein by reference. One or more chiplets of any type can be applied to a display.

Referring back to FIG. 1, display substrate 400 can be glass, plastic, metal foil, or other substrate types known in the art. Display substrate 400 has a device side 401 over which the EL emitter 50 is disposed. An integrated circuit chiplet, e.g., control chiplet 410, having a chiplet substrate 411 different from and independent of the display substrate 400 is located over, and affixed to, the device side 401 of the display substrate 400. Control chiplet 410 can be affixed to the display substrate using e.g., a spin-coated adhesive. Control chiplet 410 also includes connection pad 412, which can be metal. Planarization layer 402 overlays control chiplet 410 but has an opening or via over pad 412. Metal layer 403 makes contact with pad 412 at the via and carries the drive signal 210 from the control chiplet 410 to pixel 60. One control chiplet 410 can provide drive signals 210 to one or to multiple pixels 60.

Control chiplets 410 and decryption chiplet 430 are separately manufactured from the display substrate 400 and then applied to the display substrate 400. The chiplets 410, 430 are preferably manufactured using silicon or silicon on insulator (SOI) wafers using known processes for fabricating semiconductor devices. Each chiplet 410, 430 is then separated prior to attachment to the display substrate 400. The crystalline base of each chiplet 410, 430 can therefore be considered a chiplet substrate 411 separate from the display substrate 400 and over which the chiplet circuitry is disposed. The plurality of chiplets 410, 430 therefore has a corresponding plurality of chiplet substrates 411 separate from the display substrate 400 and each other. In particular, the independent chiplet substrates 411 are separate from the display substrate 400 on which the pixels are formed and the areas of the independent, chiplet substrates 411, taken together, are smaller than the display substrate 400. Chiplets 410, 430 can have a crystalline chiplet substrate 411 to provide higher performance active components than are found in, for example, thin-film amorphous or polycrystalline silicon devices. Chiplets 410, 430 can have a thickness preferably of 100 μm or less, and more preferably 20 μm or less. This facilitates formation of the planarization layer 402 over the chiplet 410, 430 using conventional spin-coating techniques. According to an embodiment, chiplets 410, 430 formed on crystalline silicon chiplet substrates 411 are arranged in a geometric array and adhered to a display substrate 400 with adhesion or planarization materials. Connection pads 412 on the surface of the chiplets 410, 430 are employed to connect each chiplet 410, 430 to signal wires, power busses and row or column electrodes to drive pixels (e.g., metal layer 403). In some embodiments, chiplets 410, 430 control at least four EL emitters 50.

Since the chiplets 410, 430 are formed in a semiconductor substrate, the circuitry of the chiplet 410, 430 can be formed using modern lithography tools. With such tools, feature sizes of 0.5 microns or less are readily available. For example, modern semiconductor fabrication lines can achieve line widths of 90 nm or 45 nm and can be employed in making chiplets 410, 430. The chiplet 410, 430, however, also requires connection pads 412 for making electrical connection to the metal layer 403 provided over the chiplets 410, 430 once assembled onto the display substrate 400. The connection pads 412 are sized based on the feature size of the lithography tools used on the display substrate 400 (for example 5 μm) and the alignment of the chiplets 410, 430 to any patterned features on the metal layer 403 (for example ±5 μm). Therefore, the connection pads 412 can be, for example, 15 μm wide with 5 μm spaces between the pads 412. The pads 412 will thus generally be significantly larger than the transistor circuitry formed in the chiplet 410, 430.

The pads 412 can generally be formed in a metallization layer on the chiplet 410, 430 over the transistors. It is desirable to make the chiplet 410, 430 with as small a surface area as possible to enable a low manufacturing cost.

By employing chiplets 410, 430 with independent chiplet substrates 411 (e.g., comprising crystalline silicon) having circuitry with higher performance than circuits formed directly on the display substrate 400 (e.g., amorphous or polycrystalline silicon), an EL display with higher performance is provided. Since crystalline silicon has not only higher performance but also much smaller active elements (e.g., transistors), the circuitry size is much reduced. A useful control chiplet 410 can also be formed using micro-electromechanical (MEMS) structures, for example as described in "A novel use of MEMs switches in driving AMOLED", by Yoon, Lee, Yang, and Jang, Digest of Technical Papers of the Society for Information Display, 2008, 3.4, p. 13.

The display substrate 400 can include glass and the metal layer or layers 403 can be made of evaporated or sputtered metal or metal alloys, e.g., aluminum or silver, formed over a planarization layer 402 (e.g., resin) patterned with photo-lithographic techniques known in the art. The chiplets 410, 430 can be formed using conventional techniques well established in the integrated circuit industry.

Figure 13:
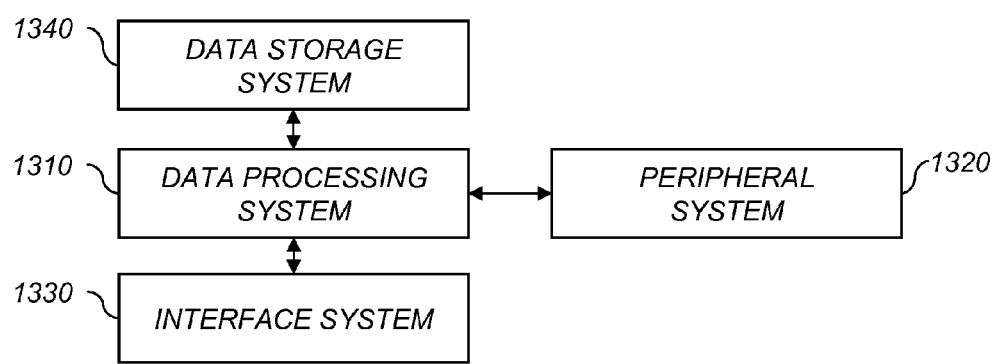
FIG. 13 is a high-level diagram showing the components of a data-processing system.

FIG. 13 is a high-level diagram showing the components of a data-processing system for decompressing or decrypting according to various embodiment employing decompressors or decryptors using programs. The system includes a data processing system 1310, a peripheral system 1320, an interface system 1330, and a data-storage system 1340. The peripheral system 1320, the interface system 1330 and the data-storage system 1340 are communicatively connected to the data processing system 1310. These components can be included, e.g., in a control chiplet 410 (FIG. 2), a decryption chiplet 430 (FIG. 2), or a decompression chiplet 460 (FIG. 7)

The data processing system 1310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data-storage system 1340 includes one or more processor-accessible memories configured to store information, including the information needed to execute the processes of various embodiments, including the example processes described herein. The data-storage system 1340 can be a distributed processor-accessible memory system including multiple processor-accessible memories communicatively connected to the data processing system 1310 via a plurality of computers or devices. On the other hand, the data-storage system 1340 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors. In this regard, although the data-storage system 1340 is shown separately from the data processing system 1310, one skilled in the art will appreciate that the data-storage system 1340 can be stored completely or partially within the data processing system 1310. Further in this regard, although the peripheral system 1320 and the interface system 1330 are shown separately from the data processing system 1310, one skilled in the art will appreciate that one or both of such systems can be stored completely or partially within the data processing system 1310.

The peripheral system 1320 can include one or more devices configured to provide digital content records to the data processing system 1310. For example, the peripheral system 1320 can include transceivers, receivers, or other data processors. The data processing system 1310, upon receipt of digital content records from a device in the peripheral system 1320, can store such digital content records in the data-storage system 1340.

The interface system 1330 can include any combination of devices from which data is input to the data processing system 1310. In this regard, although the peripheral system 1320 is shown separately from the interface system 1330, the peripheral system 1320 can be included as part of the interface system 1330.

The interface system 1330 also can include a transmitter, a processor-accessible memory, or any device or combination of devices to which data is output by the data processing system 1310. In this regard, if the interface system 1330 includes a processor-accessible memory, such memory can be part of the data-storage system 1340 even though the interface system 1330 and the data-storage system 1340 are shown separately in FIG. 1.In a preferred embodiment, an EL display that includes Organic Light Emitting Diodes (OLEDs) which are composed of small molecule or polymeric OLEDs as disclosed in but not limited to U.S. Pat. Nos. 4,769,292 and 5,061,569, the disclosures of both of which are incorporated herein by reference. Many combinations and variations of organic light emitting materials can be used to fabricate such a display. Referring to FIG. 1, pixel 60 can be an EL pixel, and preferably an OLED pixel. That is, pixel 60 can include an EL emitter (not shown) for emitting light in response to current, and preferably an organic EL emitter (OLED). Inorganic EL displays can also be employed, for example quantum dots formed in a polycrystalline semiconductor matrix (for example, as taught in US Publication 2007/0057263 by Kahen, the disclosure of which is incorporated herein by reference), and displays employing organic or inorganic charge-control layers, or hybrid organic/inorganic devices.

Chiplets 410, 430 and pixels 60 can include transistors of amorphous silicon (a-Si), low-temperature polysilicon (LTPS), zinc oxide, or other types known in the art. Such transistors can be N-channel, P-channel, or any combination. When pixel 60 includes an EL emitter, pixel 60 can be a non-inverted structure in which the EL emitter is connected between a drive transistor and a cathode, or an inverted structure in which the EL emitter is connected between an anode and a drive transistor.

The invention has been described in detail with particular reference to certain preferred embodiments thereof, but it will be understood that combinations of embodiments, variations and modifications can be effected within the spirit and scope of the invention.

PARTS LIST

15 display area
16 sealed area
35 data line
50 EL emitter
60, 62*a*, 62*b*, 67*a*, 67*b* pixel
200 encrypted image signal
201 encrypted local image signal
1205 control signal
210 drive signal
215 pseudo-random bit stream (PRBS)
220 compressed image signal
400 display substrate
401 device side
402 planarization layer
403 metal layer
404 input electrode
408 cover
409 seal
410 control chiplet
411 chiplet substrate
412 pad
415 XOR unit
420 driver IC
421 ball
422 glob-top
430 decryption chiplet
431*a*, 431*b* decryptor
432 memory
434 pass-through
435*a*, 435*b* monitor
436 electrical connection
437*ge* fuse
440 source driver chiplet
422*bc* transistor
450 demultiplexer
460 decompression chiplet
461, 461*a*, 461*b* decompressor
462, 463 link
1000 display
1009 image signal
1011, 1016 control unit
1091 algorithm block
1092*a*, 1092*b* pixel data
1096 algorithm block
1097*a*, 1097*b* pixel data
1100 display
1111, 1116 control chiplet
1160 decompression chiplet
1161 decompressor
1200 display
1211, 1216 control chiplet
1230 decryption chiplet
1231 decryptor
1310 data-processing system
1320 peripheral system
1330 interface system
1340 data-storage system

What is claimed is:

1. A display for securely decrypting an encrypted image signal, comprising:
    a) a display substrate having a display area, and an encapsulating cover affixed to the display substrate;
    b) a plurality of pixels disposed between the display substrate and the encapsulating cover in the display area for providing light to a user in response to a drive signal;
    c) a plurality of control chiplets, each of which is disposed between the display substrate and the encapsulating cover and is disposed in the display area, each including a respective chiplet substrate separate and distinct from the display substrate, connected to one or more of the plurality of pixels, for receiving a respective control signal and producing respective drive signal(s) for the connected pixel(s); and d) exactly one decryption chiplet, which is disposed between the display substrate and the encapsulating cover and is disposed in the display area, that includes:
  i) a chiplet substrate separate and distinct from the display substrate;
  ii) means for receiving the encrypted image signal; and
  iii) a decryptor for decrypting the encrypted image signal to produce a respective control signal for each of the control chiplets and transmitting each control signal to the corresponding control chiplet;
wherein there are no other decryption chiplets present in the display.

2. The display of claim 1, wherein each pixel is an electroluminescent (EL) pixel, and further including an encapsulant for affixing the encapsulating cover to the display substrate, so that the encapsulant, substrate and encapsulating cover reduce moisture ingress into the area between the display substrate and the encapsulating cover.

3. The display of claim 1, further including
  e) one or more data line(s), each connected to one or more of the control chiplets; and
  f) a source driver chiplet having a chiplet substrate separate and distinct from the display substrate and connected to the decryption chiplet and to the data line(s) for communicating the control signals from the decryption chiplet to the control chiplets using the data line(s).

4. The display of claim 3, wherein the source driver chiplet is located in the display area.

5. The display of claim 1, wherein the decryption chiplet and a selected one of the control chiplets further include respective link-integrity-monitoring circuits for determining whether communications between the decryption chiplet and control chiplet are being monitored, wherein when the decryption chiplet and selected control chiplet determine said communications are being monitored, the link-integrity-monitoring circuit of the decryption chiplet prevents the decryptor from producing the control signal for the selected control chiplet, causes the decryptor to produce the control signal for the selected control chiplet using a security signal instead of the encrypted image signal, or causes the decryption chiplet to self-destruct.

6. The display of claim 5, wherein the link-integrity-monitoring circuits are for measuring the time delay of signal propagation of the control signal from the decryption chiplet to the selected control chiplet.

7. The display of claim 5, further comprising an electrical connection between the link-integrity-monitoring circuits in the decryption chiplet and in the selected control chiplet; wherein the link-integrity-monitoring circuits are for measuring the impedance of the electrical connection.

8. The display of claim 7, wherein the electrical connection includes a wire having impedance that changes with exposure to an external environment.

9. The display of claim 1, wherein the decryption chiplet includes a decryption key for decrypting the encrypted image signal.

10. The display of claim 9, wherein the decryption chiplet further includes a non- volatile memory that stores the decryption key.

11. The display of claim 1, wherein the decryption chiplet further includes a pad for making an electrical connection to one of the control chiplets, and wherein the decryption chiplet is disposed over the display substrate so that the pad is on the side of the chiplet substrate of the decryption chiplet farther from the display substrate.

* * * * *